(12) United States Patent  
Eddins

(10) Patent No.: US 8,650,542 B1  
(45) Date of Patent: Feb. 11, 2014

(54) HIERARCHICAL, SELF-DESCRIBING FUNCTION OBJECTS

(75) Inventor: Steven L. Eddins, Milford, MA (US)

(73) Assignee: The Mathworks, Inc., Natick, MA (US)

( * ) Notice: Subject to any disclaimer, the term of this patent is extended or adjusted under 35 U.S.C. 154(b) by 383 days.

(21) Appl. No.: 13/072,165

(22) Filed: Mar. 25, 2011

(51) Int. Cl.  
*G06F 9/44* (2006.01)

(52) U.S. Cl.  
USPC .............................. 717/123; 717/106; 717/120

(58) Field of Classification Search  
USPC .................................................. 717/100–140  
See application file for complete search history.

(56) References Cited

PUBLICATIONS

Mathworks Image Processing Toolbox Documentation for makecform. Print date Mar. 25, 2011, 3 pages. http://www.mathworks.com/help/toolbox/images/ref/makecform.html.

*Primary Examiner* — Chuck Kendall  
(74) *Attorney, Agent, or Firm* — Harrity & Harrity, LLP

(57) ABSTRACT

A self-describing function object may be dynamically created based on a set of user provided parameters. In an implementation, a device may receive a request to create the function object based on one or more parameters and determine a number of ordered and hierarchical operations that correspond to the function object. The device may determine textual descriptions corresponding to what is performed by at least one of the ordered and hierarchical operations. The device may output documentation of the ordered and hierarchical operations included in the function object, the documentation including the textual descriptions arranged based on the determined order of the plurality of ordered and hierarchical operations.

23 Claims, 7 Drawing Sheets

```
function f = makeLut8Function(M, input_tables, CLUT, output_tables, input_space)
sequence = {};
if strcmpi(input_space, 'XYZ')
    M = M(:, 1:3);
    sequence{end+1} = ColorTransformFunction(applyMatrix(in, M, ...
        3, 3, 'Apply matrix.');
end
sequence{end+1} = icc.makeCurveFcn(input_tables);
sequence{end+1} = icc.makeClutFunction(CLUT, numel(output_tables));
sequence{end+1} = icc.makeCurveFcn(output_tables);
if strcmpi(output_space, 'Lab')
    converta = ColorTransformFunction(fh_a, 3, 3, 'Scale and shift a values
        to normal range.');
    fh_b = @(in) canonical.transformColumn(in, @(b) 255*b - 128, 3);
    convertb = ColorTransformFunction(fh_b, 3, 3, 'Scale and shift b values
        to normal range.');
    sequence{end+1} = images.color.ColorTransformFunction({converta, convertb},
        'Convert double-precision Lab values in [0,1] range to normal
        double-precision encoding.');
end
f = images.color.ColorTransformFunction(sequence, 'Apply lut8 tag.');
```

Fig. 6

HIERARCHICAL, SELF-DESCRIBING FUNCTION OBJECTS

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 6 is a diagram illustrating an example of pseudo-code that may be used to implement the functions of an object creation component shown in FIG. 3.

DETAILED DESCRIPTION

Figure 1:
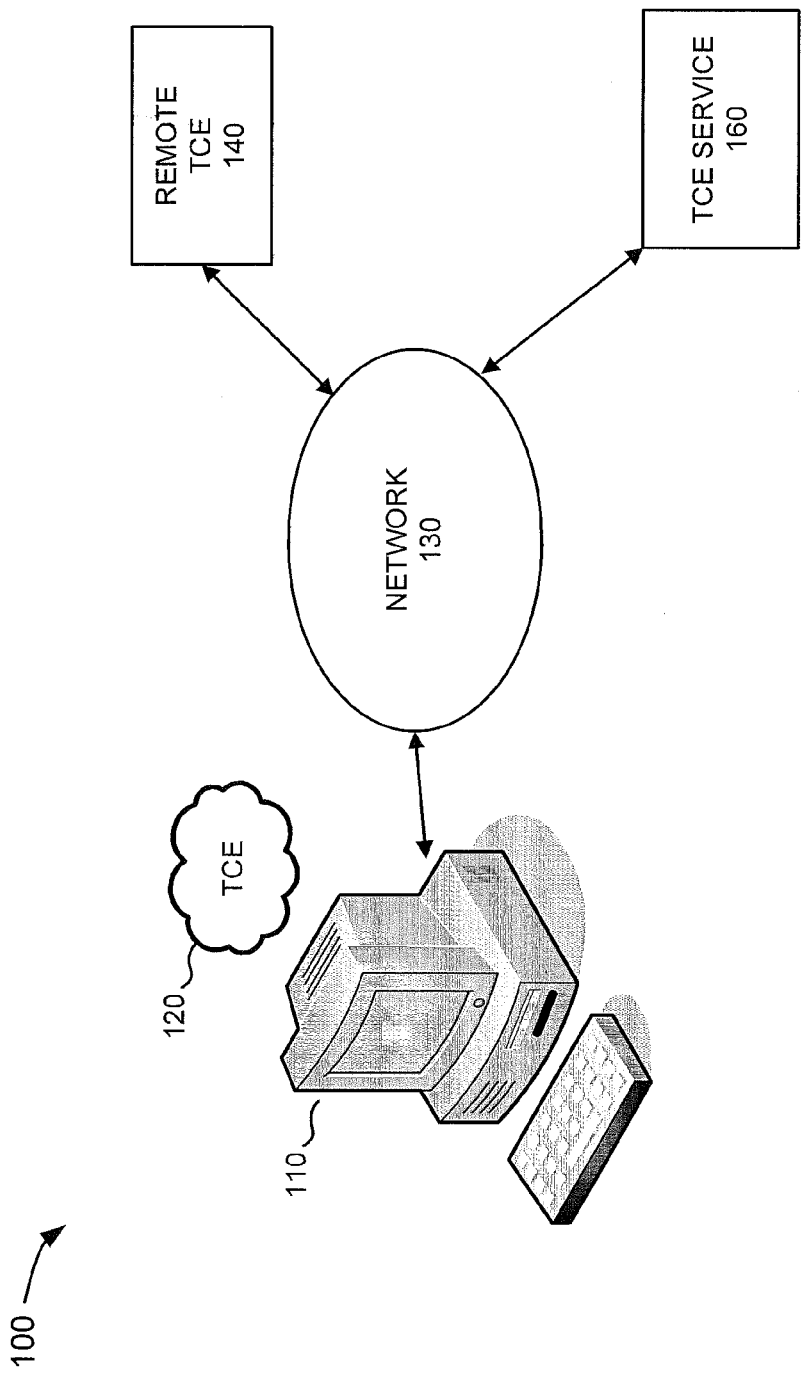
FIG. 1 is a diagram of an example system in which concepts described herein may be implemented.

The following detailed description refers to the accompanying drawings. The same reference numbers in different drawings may identify the same or similar elements.

When using a computing environment, such as a technical computing environment, a user may create function objects to perform specified tasks. A function object may be dynamically generated by the technical computing environment based on input parameters supplied by the user. For example, the technical computing environment may provide a tool to generate a function object that performs color management functions, such as converting between different color profile spaces. The function object may be dynamically generated, by the technical computing environment, based on one or more parameters, such as an International Color Consortium (ICC) profile. After the function object is generated, the function object may be called (e.g., by code written by the user, a command specified by the user) to perform its intended function, such as converting colors between color spaces.

From the user's perspective, a dynamically generated function object may be a "black box" in which it can be difficult to learn or to modify the particular operations performed by the generated function object. This can be problematic for "advanced" users that wish to verify or modify the operation of the function object.

Implementations described herein may relate to the generation of self-describing function objects that include an ordered sequence of operations. The sequence of operations may be hierarchical such that, for example, each of the operations may refer to a sequence of operations. The operations may be associated with a description of the operation. Based on the individual descriptions, the function object may generate a full description of the operation of the function object.

DEFINITIONS

A "function object," as used herein, may refer to a software construct, such as an object, structure, method, or function, that is generated by another software object based on one or more input parameters. The input parameters may include real values, images, files, references to files, etc. The function object may include the ability to perform a function or algorithm and may be able to return descriptive text describing the function/algorithm.

A Technical Computing Environment (TCE) may include any hardware and/or software based logic that provides a computing environment that allows tasks to be performed (e.g., by users) related to disciplines, such as, but not limited to, mathematics, science, engineering, medicine, and business. The TCE may include text-based facilities (e.g., MATLAB® software), a graphically-based environment (e.g., Simulink® software, Stateflow® software, SimEvents™ software, etc., by The MathWorks, Inc.; VisSim by Visual Solutions; LabView® by National Instruments; etc.), or another type of environment, such as a hybrid environment that may include, for example, one or more of the above-referenced text-based environments and one or more of the above-referenced graphically-based environments.

The TCE may be integrated with or operate in conjunction with a graphical modeling environment, which may provide graphical tools for constructing models or systems or processes. The TCE may include additional tools, such as tools designed to convert a model into an alternate representation, such as source computer code, compiled computer code, or a hardware description (e.g., a description of a circuit layout). In an implementation, the TCE may provide this ability using graphical toolboxes (e.g., toolboxes for signal processing, image processing, color manipulation, data plotting, parallel processing, etc.). In another implementation, the TCE may provide these functions as block sets. In still another implementation, the TCE may provide these functions in another way.

Models generated with the TCE may be, for example, models of a physical system, a computing system, an engineered system, an embedded system, a biological system, a chemical system, etc.

As previously mentioned, an example embodiment of the TCE may use one or more text-based products, such as textual modeling environments. For example, a text-based modeling environment, may be implemented using products such as, but not limited to, MATLAB® by The MathWorks, Inc.; Octave, Python, Comsol Script, and MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. In some embodiments, the text-based modeling environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In an implementation, the text-based modeling environment may include a dynamically typed language that may be used to express problems and/or solutions in mathematical notations familiar to those of skill in the relevant arts. For example, the modeling environment may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

The modeling environment may further be adapted to perform matrix and/or vector formulations that may be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

In another example embodiment, the TCE may be implemented in a graphically-based modeling environment using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

System Description

FIG. 1 is diagram of an example system 100 in which concepts described herein may be implemented. System 100 may include a personal computer or computing device 110. Computing device 110 may execute a TCE 120 that presents a user with an interface that enables design, analysis, and generation of, for example, technical applications, engineered systems, and business applications. For example, TCE 120 may provide a numerical and/or symbolic computing environment that allows for matrix manipulation, plotting of functions and data, implementation of algorithms, creation of user interfaces, and/or interfacing with programs in other languages. TCE 120 may particularly include a graphical modeling component and a component to convert graphic models into other forms, such as computer source code (e.g., C++ code) or hardware descriptions (e.g., a description of an electronic circuit).

Computing device 110 may operate as a single detached computing device. Alternatively, computing device 110 may be connected to a network 130, such as a local area network (LAN) or a wide area network (WAN), such as the Internet. After computing device 110 is connected to network 130, TCE 120 may be run by multiple networked computing devices or by one or more remote computing devices. In such an implementation, TCE 120 may be executed in a distributed manner, such as by executing on multiple computing devices simultaneously. Additionally, in some implementations, TCE 120 may be executed over network 130 in a client-server relationship. For example, computing device 110 may act as a client that communicates with, using a web browser, a server that stores and potentially executes the graphical modeling environment program.

For example, as shown in FIG. 1, system 100 may include a remote TCE 140 (e.g., a remotely located computing device running a TCE) and/or a TCE service 160. TCE service 160 may include a server computing device that provides a TCE as a remote service. For instance, a TCE may be provided as a web service. The web service may provide access to one or more programs provided by TCE service 160.

Figure 2:
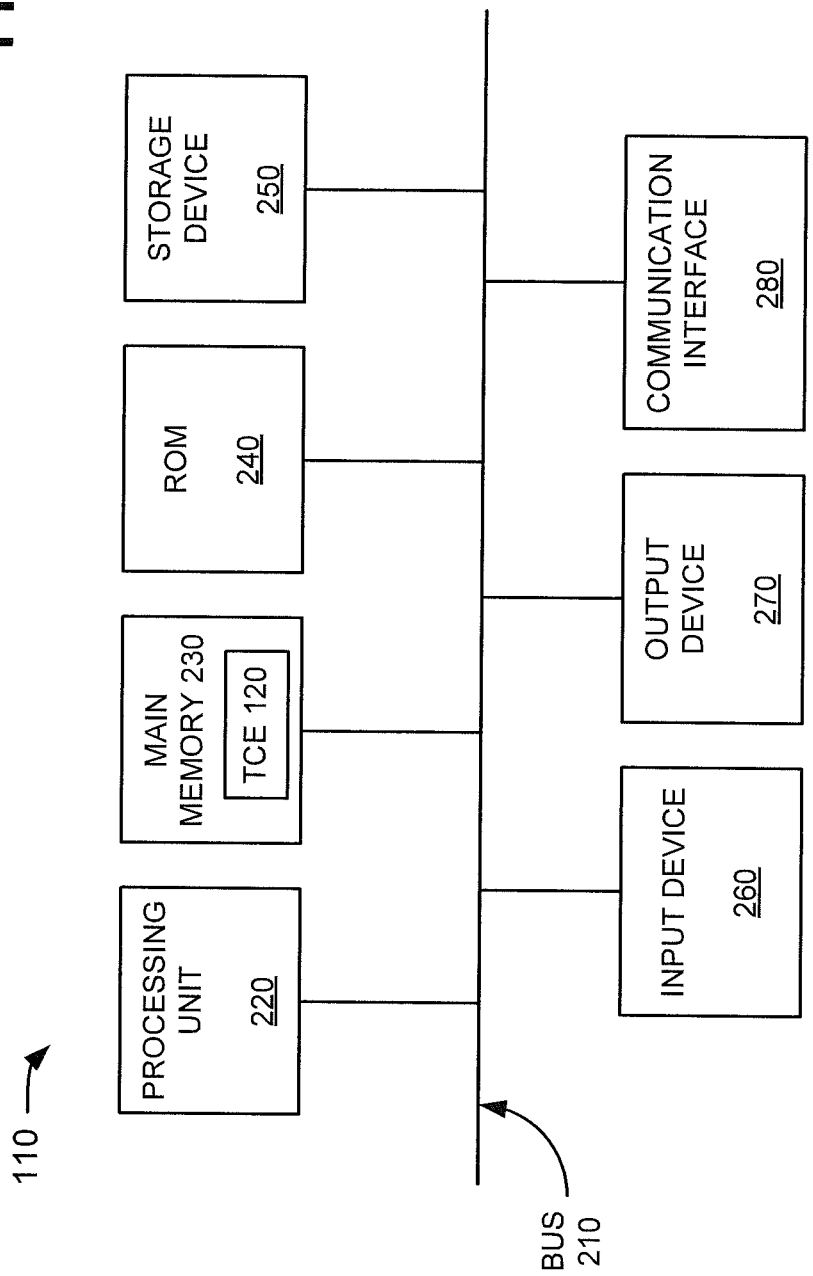
FIG. 2 is a diagram of an example device corresponding to one of the devices shown in FIG. 1.

FIG. 2 is a diagram of an example device that may correspond to computing device 110 and/or a remote device running remote TCE 140 and/or TCE service 160. As illustrated, computing device 110 may include a bus 210, a processing unit 220, a main memory 230, a read-only memory (ROM) 240, a storage device 250, an input device 260, an output device 270, and/or a communication interface 280. Bus 210 may include a path that permits communication among the components of computing device 110.

Processing unit 220 may include a processor, multiple processors, microprocessors, or other types of processing logic that may interpret and/or execute instructions. Main memory 230 may be a tangible non-transitory computer-readable medium, such as a random access memory (RAM) or another type of dynamic storage device that may store information and instructions for execution by processing unit 220 (e.g., instructions implementing TCE 120). ROM 240 may include a read only memory (ROM) device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to computing device 110, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator from computing device 110, including a display, a printer, a speaker, etc. In the case of a display, the display may be a touch screen display that acts as both an input and an output device. Moreover, input device 260 and/or output device 270 may be haptic type devices (e.g., joysticks), tactile sensors, or other devices based on touch.

Communication interface 280 may include a transceiver-like mechanism that enables computing device 110 to communicate with other devices and/or systems. For example, communication interface 280 may include mechanisms for communicating with another device or system via a network.

As will be described in detail below, computing device 110 may perform certain operations in response to processing unit 220 executing software instructions contained in a computer-readable medium, such as main memory 230. The computer-readable medium may be defined as a non-transitory memory device, where the memory device may include a number of physically, possible physically distributed, memory devices. For instance, computing device 110 may implement TCE 120 by executing software instructions from main memory 230. As will be described in more detail below, TCE 120 may implement one or more embodiments of the invention.

The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of computing device 110, in other implementations, computing device 110 may contain fewer components, different components, differently arranged components, or additional components than depicted in FIG. 2. Alternatively, or additionally, one or more components of computing device 110 may perform one or more tasks described as being performed by one or more other components of computing device 110.

Self-Describing Function Objects

Figure 3:
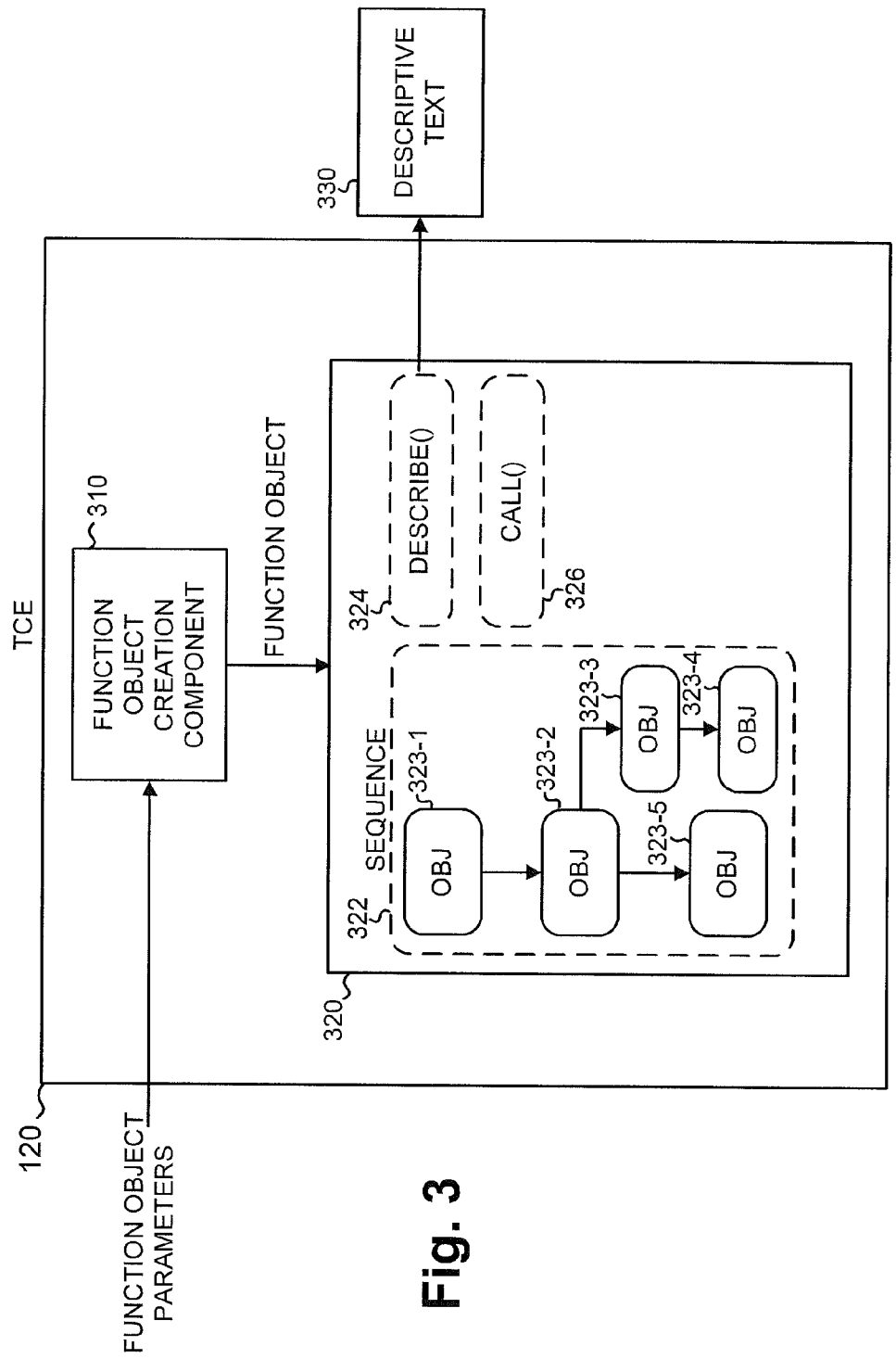
FIG. 3 is a diagram illustrating example functional components of a technical computing environment that relate to generation of self-describing function objects.

FIG. 3 is a diagram illustrating example functional components of TCE 120 that relate to generation of self-describing function objects. The functions described in connection with FIG. 3 may be performed by one or more components of computing device 110 depicted in FIG. 2. As shown in FIG. 3, TCE 120 may include a function object creation component 310. Function object creation component 310 may generate function objects, such as function object 320. Function object 320 may further generate descriptive text 330, pursuant to, for example, a user command. In some implementations, descriptive information other than "text" may be generated. For example, descriptive text 330 may include graphical information (e.g., one or more diagrams or images).

Function object creation component 310 may include logic for creating function object 320 based on one or more input parameters. Function object creation component 310 may include logic to (1) analyze the input parameters, and, (2) based on the parameters, identify a number of ordered, and potentially hierarchical operations, that correspond to the input parameters. The identification of the operations that correspond to the input parameters may be based on, for example, rules that are coded by a distributor (e.g., creator) of function object creation component 310 (e.g., the creator of TCE 120 or another entity).

In addition to identifying the ordered operations that correspond to the input parameters, function object creation component 310 may also identify descriptive text corresponding to one or more of the operations. The descriptive text for an operation may include, for example, a description of the function of the operation, inputs associated with or required by the operation, outputs generated by the operation, or other descriptive information. The identification of the descriptive text that corresponds to the operations may be based on, for example, rules that are coded by the distributor of function object creation component 310 (e.g., the creator of TCE 120 or another entity).

In an implementation, function object creation component 310 may include an object that relates to color computations. For example, function object creation component 310 may create a color transformation object that defines a color space conversion between members of a family of device-independent color spaces defined by the International Color Consortium (ICC). Here, the parameters that may be input to function object creation component 310 may include color lookup tables (CLUTs) from an ICC profile. Alternatively or additionally, function object creation component 310 may relate to other technical areas.

Function object creation component 310 may be called, by a user, through a command line user interface of TCE 120. Alternatively, function object creation component 310 may be called, by the user, in another manner, such as through a graphic programming environment or an application programming interface (CPI). Calling function object creation component 310 may result in function object creation component 310 dynamically generating function object 320.

Function object 320 may include a software structure, such as a C programming language structure or a C++ class or class instance, that encapsulates the hierarchical sequence of operations that perform the "core" function of function object 320 (i.e., the function for which the user created function object 320). Function object 320 may include a number of properties and/or methods. As shown, function object 320 may include a sequence of operations 322, a describe method 324, and a call method 326. Sequence of operations 322 may include a sequence (e.g., a list, array, or other ordered data structure) of objects 323-1 through 323-5 (referred to collectively as objects 323 or individually as object 323). Each of objects 323 may itself be a function object. An object 323 may include instructions that may be executed to perform the operation corresponding to object 323. Objects 323 may receive input values, generate output values, and pass the output values to the next object 323 in sequence of operations 322. Objects 323 may be hierarchically defined. For example, object 323-2 may be a function object that includes the object sequence 323-3 and 323-4, where objects 323-3 and 323-4 are also function objects. The operation of object 323-2 may thus include the operation corresponding to object 323-3 followed by the operation corresponding to object 323-4.

Describe method 324 of function object 320 may include logic that, when called, may generate descriptive text 330 corresponding to function object 320. Describe method 324 may generally concatenate descriptive text corresponding to some or all of objects 323 into a single text document (e.g., embodied by descriptive text 330). In an implementation, descriptive text 330 may include visual formatting corresponding to a hierarchical arrangement of objects 323. For example, descriptive text 330 may be a hyper-text markup language (HTML) document in which the descriptive text corresponding to each object 323 is represented in a paragraph and in which lower objects in the hierarchy (e.g., objects 323-3 and 323-4) are indented in an outline format. Other visual formats or techniques for implementing descriptive text 330 may alternatively be performed.

Call method 326 of function object 320 may include logic that, when called, may initiate execution of one or more operations defined in sequence of operations 322. Call method 326 may be called by, for example, a user during an interactive session with TCE 120, or in another manner, such as from a predefined script or other program.

Although FIG. 3 illustrates example functional components of TCE 120, in some implementations, TCE 120 may include fewer functional components, different functional components, differently arranged functional components, or additional functional components than those depicted in FIG. 3. Additionally, or alternatively, one or more of the functional components of TCE 120 may perform one or more tasks described as being performed by one or more other functional components of TCE 120.

Figure 4:
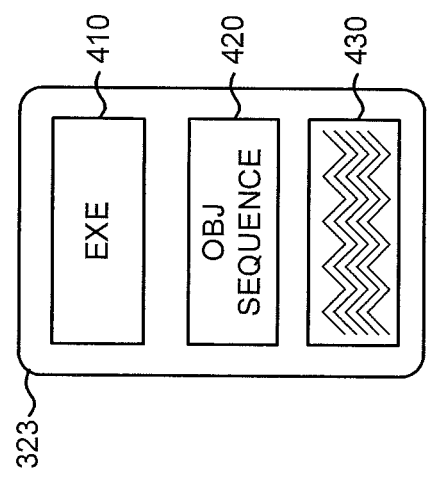
FIG. 4 is a diagram illustrating an example of components of a software object shown in FIG. 3.

FIG. 4 is a diagram illustrating example components of an object 323. The components of object 323 may include, for example, data structures, executable programming instructions, text, or other information that may be stored on a computer-readable medium. As shown, the components of object 323 may include executable (EXE) code 410, a function object sequence 420, and descriptive text 430.

Executable code 410 may implement one or more substantive operations performed by object 323. Executable code 410 may receive zero or more input parameters (e.g., from a previous object 323 in sequence of operations 322), perform operations based on the input parameters (if any), and generate output values for a next object 323 in sequence of operations 322. Executable code 410 may correspond to a method or function implemented in a programming language such as C, MATLAB code, C++, etc. For a color conversion application, for example, executable code 410 may be a function to linearize input red, green, blue (RGB) color values for a particular object 323.

Function object sequence 420 may include, for example, a list, a sequence, an array, or another ordered structure that references other objects 323. The objects referenced by function object sequence 420 may be one level below the containing object 323 in the hierarchical sequence of objects. In an implementation, the objects referenced in object sequence 420 may themselves include references to additional objects 323. In an implementation, a particular object 323 may include either executable code 410 or function object sequence 420. If the particular object 323 includes only executable code 410, the object may be a "leaf" node in the hierarchy of objects and executable code 410 may be run to implement the operation corresponding to the object. Otherwise, if the particular object 323 includes function object sequence 420, the corresponding lower level objects in the hierarchy may be traversed to determine whether the objects include executable code 410. In this implementation, the sequence of executable code 410 corresponding to function object sequence 420 may be obtained by a depth-first traversal of the hierarchical sequence of objects.

Descriptive text 430 may include text that describes object 323. The descriptive text may include, for example, the name of a function or method (e.g., the substantive operation) implemented by executable code 410, the parameters used by the function or method, a description of the operation of the function or method, or other descriptive information. Some objects 323 may not be associated with descriptive text, in which case descriptive text 430 may be empty or may not be associated with object 323. In some implementations, descriptive text 430 may also be associated with formatting information, such as bold text, italic text, etc. The formatting information may be associated with descriptive text 430 using, for example, a markup language such as HTML.

Although FIG. 4 illustrates example functional components of one of objects 323, in some implementations, one of objects 323 may include fewer functional components, different functional components, differently arranged functional components, or additional functional components than those depicted in FIG. 4. Additionally, or alternatively, one or more of the functional components of one of objects 323 may perform one or more tasks described as being performed by one or more other functional components of one of objects 323.

Figure 5:
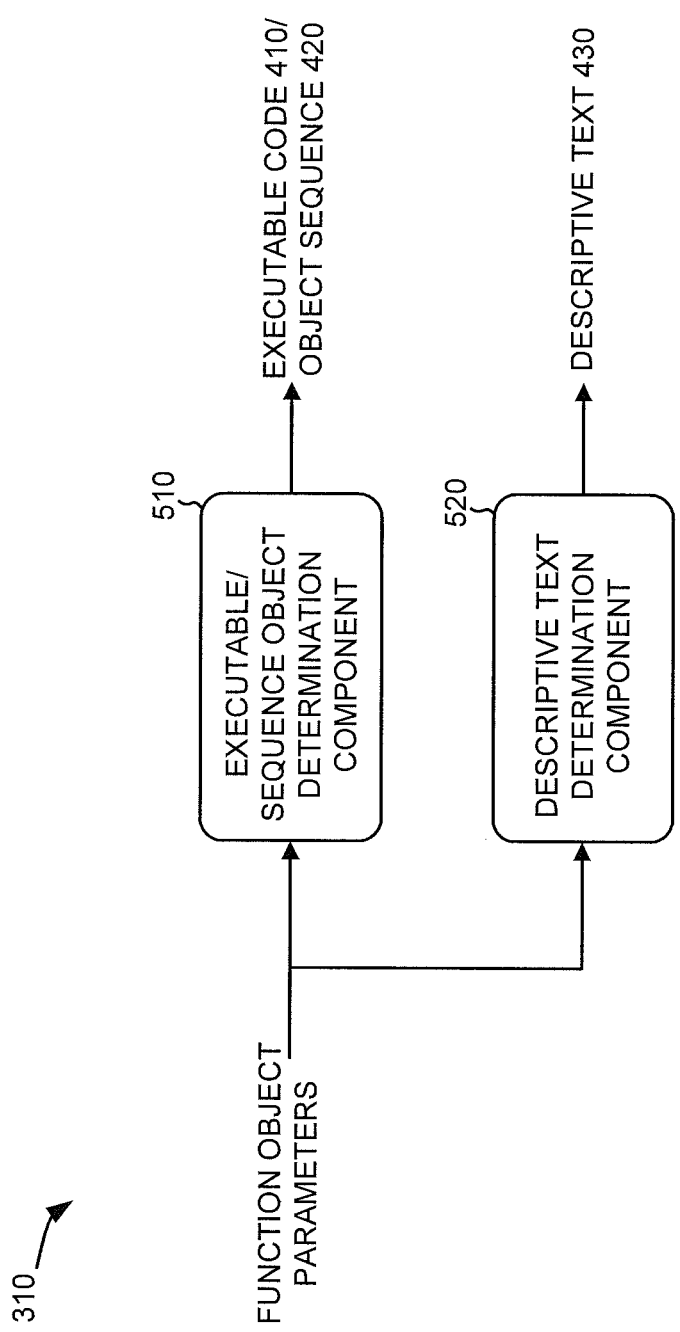
FIG. 5 is a diagram illustrating example functional components of a function object creation component shown in FIG. 3.

FIG. 5 is a diagram illustrating example functional components of function object creation component 310. As previously mentioned, function object creation component 310 may dynamically generate function object 320 in response to one or more input parameters ("Function Object Parameters"). Function object creation component 310 may include an executable/sequence object determination component 510 and a descriptive text determination component 520.

Executable/sequence object determination component 510 may, based on the function object parameters, identify executable code 410 and/or object sequences 420 to include in each of objects 323. Executable code 410 and/or object sequences 420 may be identified, for example, by a set of rules (or other techniques) associated with executable/sequence object determination component 510.

Descriptive text determination component 520 may, based on the function object parameters, determine descriptive text 430 to include in each of objects 323. Descriptive text 430 may be determined, for example, by a set of rules (or other techniques) associated with descriptive text determination component 520.

Although executable code 410/object sequence 420 and descriptive text 430 are shown in FIG. 5 as being separately generated, in some implementations, the generation of executable code 410/object sequence 420 and descriptive text 430 may be performed as a single operation.

Although FIG. 5 illustrates example functional components of function object creation component 310, in some implementations, function object creation component 310 may include fewer functional components, different functional components, differently arranged functional components, or additional functional components than those depicted in FIG. 5. Additionally, or alternatively, one or more of the functional components of function object creation component 310 may perform one or more tasks described as being performed by one or more other functional components of function object creation component 310.

FIG. 6 is a diagram illustrating an example of pseudo-code 600 to implement function object creation component 310. In FIG. 6, pseudo-code 600 may be a function object creation component 310 that is designed to generate a user customized "Lut8" function object. In general, the function performed by the Lut8 object may include several computation steps in sequence, potentially including: (1) applying a matrix, but only if the input space is 'XYZ'; (2) applying one dimensional (1-D) input curves; (3) applying a multi-dimensional lookup table; (4) applying 1-D output curves; and (5) applying special scaling if output color space is 'LAB.' The function object parameters for pseudo-code 600 may include parameters 610: "M," "input_tables," "CLUT," "output_tables," and "input_space."

In pseudo-code 600, the variable sequence may be used to hold sequence object 322. The first object included in sequence is implemented in code section 620, which may add an object 323 to sequence of operations 322, that applies a matrix and includes the descriptive text "Apply Matrix", but only if the input space is equal to "XYZ." Code sections 630, 640, and 650 may add additional objects 323 to sequence object 322. As shown, the additional objects may be added by calling functions that return objects 323 (potentially including descriptive text 430). Code section 660 may add an object 323, which includes sub-objects, to sequence of operations 322, that applies scaling functions, but only if the output color space is "Lab." The final function object 320 may be returned by code section 670, and may include the high level description "Apply lut8 tag."

Figure 7:
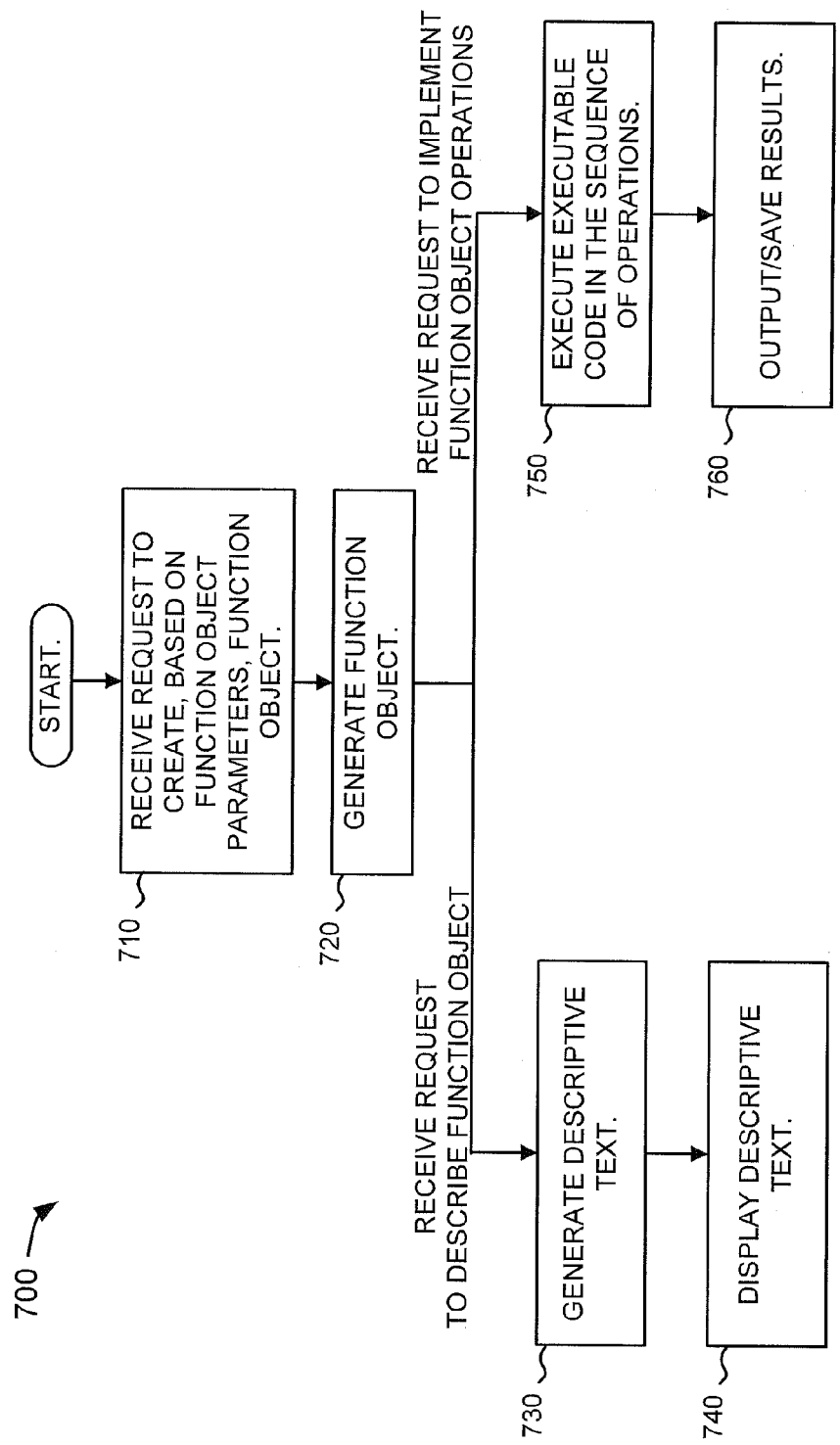
FIG. 7 is a flow chart illustrating an example process for creating and/or using a function object, for example, by a user of a technical computing environment.

FIG. 7 is a flow chart illustrating an example process 700 for creating and/or using function object 320. The operations described in FIG. 7 may be performed by, for example, TCE 120, remote TCE 140, and/or TCE service 160.

Process 700 may include receiving a request to create a function object (block 710). The request may include one or more parameters (block 710). As previously mentioned, the parameters may include, for example, real values, images, files, references to files, etc. The parameters may specify the operations (i.e., the functionality) implemented by the generated function object 320. In an implementation, in the context of a user using a command line interface to interact with TCE 120, the request to create the function object may include a command such as: "f=ColorTransformFunction(input_profile, output_profile)," where, in this example, the generated function object may be named "f" and the function object may be created by a call to "ColorTransformFunction" using the parameters "input_profile" and "output_profile." Process 700 may further include generating the function object (block 720). Generation of function object 320 may be performed by function object creation component 310, as was previously discussed.

The generated function object 320 may be used in a number of ways. For example, suppose that process 700 is implemented by TCE 120 and that function object 320 includes describe method 324 and call method 326. Note that in FIG. 7, operations associated with describe method 324 are illustrated in blocks 730 and 740 and operations associated with call method 326 are illustrated in blocks 750 and 760. Now suppose that a user wishes to generate/view a description of the operations performed by function object 320. The user may specify a command (e.g., "f.describe( )","describe(f)") to call describe method 324 via, for example, a command line user interface that is provided by TCE 120. In response to the command, TCE 120 may call the describe method 324 and generate the descriptive text (e.g., descriptive text 330) corresponding to function object 320 (block 730). Descriptive text 330 may be generated by extracting descriptive text 420 from each of objects 323 in sequence of operations 322. As previously mentioned, descriptive text 330 may be formatted to preserve the hierarchical and sequential format of the objects 323 in sequence of operations 322. In an implementation, the text corresponding to objects 323 may be labeled, such as through outline formatted labeling (e.g., the descriptive text may be labeled as items 1, 1a, 1aa, 1b, 2, etc.), to allow the corresponding objects 323 to be easily referenced. In an implementation, descriptive text 330 may include embedded formatting (e.g., HTML formatting using paragraphs to indicate hierarchical positions).

TCE 120 may further display/output the generated descriptive text (block 740). Descriptive text 330 may be, for example, output to a file, be displayed in a text window, be displayed in a browser window, etc.

In some implementations, the operations of block 730 may be performed when the function object is created. Here, a request to describe function object 320 may result in descriptive text 330 being displayed/read from function object 320 (e.g., via block 740).

Table I, below, illustrates an example of a visual presentation of descriptive text 330. Descriptive text 330 may be shown, for example, in a graphical interface of computing device 110. As shown in Table I, a number of ordered and hierarchical operations are described. In Table I, the illustrated operations may be operations used in the conversion of an ICC (International Color Consortium) version 2 RGB display profile to an ICC version 4 CMYK (cyan, magenta, yellow, and key black color model) output profile. The first operation shown in Table 1, for instance, operation "1" includes the description "Convert from device space to source profile connection space, XYZ." As shown, operation "1" includes descriptive text only and is not associated with an executable operation. Operation "1," however, is shown as having two sub-operations, labeled "1a" and "1b." Operation "1a," for example, includes the descriptive text "Linearize RGB values using the red, green, and blue tone response curves." Operation "1a" is also shown as including a particular function call that is used to perform this operation (i.e., out=applyCurves(in, trc_curves)). As shown in Table I, indentation and outline labeling are used to indicate the sequence and hierarchy of the operations that are performed to implement the function object. Additionally, different fonts are used to distinguish between descriptive text and function calls.

TABLE I

1. Convert from device space to source profile connection space, XYZ.
   a. Linearize RGB values using the red, green, and blue tone response curves.
      out = applyCurves(in, trc_curves)
   b. Convert linearized RGB values to profile connection space using the red, green, and blue colorant tags.
      out = applyMatrix(in, M)
2. Adjust black point to compensate for the difference between ICC version 2 and ICC version 4 profiles.
   out = 0.9965269 * in + (0.0034731 * whitepoint)
3. Convert from source profile connection space, XYZ, to destination profile connection space, L*a*b*.
   out = xyzTolab(in, whitepoint)
4. Convert from destination profile connection space, L*a*b*, to device space using the lutBtoA0 tag.
   a. Scale by (257/256) to adjust ICC version 2 16-bit L*a*b* encoding to ICC version 4 encoding.
      out = (257/256) * in
   b Apply one-dimensional pre-shaper curves.
      out = applyCurves(in, luttag.PreShaper)
   c. Apply pre-matrix.
      out = applyMatrix(in, M)
   d. Apply one-dimensional input tables.
      out = applyCurves(in, luttag.InputTables)
   e. Perform three-dimensional tetrahedral interpolation using grid tables.
      out = clutInterp3(clut_scale * in, luttag.CLUT)/clut_scale
   f. Apply one-dimensional output tables.
      out = applyCurves(in, luttag.OutputTables)

Referring back to FIG. 7, suppose that the user wishes to execute the operations of function object 320. The user may issue a command to execute call method 326 (e.g., "f.call( )", "call(f)"). In response, TCE 120 may execute executable code 410 in sequence of operations 322 (block 750). As previously mentioned, executable code 410 of objects 323 may be executed in their sequence and hierarchical order, where results of the execution of executable code 410 of one object 323 may be input to executable code 410 of a next object 323. The final result or set of results may be output to the user or saved (e.g., output to a display of computing device 110, saved to a disk of computing device 110).

Function object 320, as described above, may include a number of methods and/or properties, such as describe method 324 and call method 326. Note that function object 320 may include additional methods/properties. For example, function object 320 may allow modification of sequence of operations 322 based on descriptive text 330. In an implementation, labels may be used in descriptive text 330 to insert, delete, or replace objects 323. For instance, for a function object "f", a command: "f.replace('1a', <new executable code>, <new description>)," may replace the object labeled "1a" (e.g., in Table I, the linearize RGB values object) with an object that includes user specified executable code and descriptive text. Similarly, a command "f.insert" may be used to insert a new object or sub-object in function object 320 and a command "f.delete" may be used to delete an object. In this manner, descriptive text 330 may be used to not only understand the operation of a dynamically created function object, but also to modify the operation of the function object.

Function objects were described above that may be applicable to a variety of technical disciplines, such as color space manipulation. Additional details relating to color science functionality will now be given.

Transforming color values from one color space to another may be done using a combination of mathematical operations. These operations involve taking one vector and producing another. Commonly used operations may include: (1) scale and offset; (2) power curve (also called a gamma curve); (3) other parameterized curves; (4) 1-D lookup table curve;

(5) multidimensional lookup table; (6) matrix multiplies; and (7) saturation to range. Each of these operations may be represented by one or more objects 323 in a sequence of objects 322.

In a typical color conversion problem, the color reproduction characteristics of a first device A and the color reproduction characteristics of a second device B may be known. Function objection creation component 310 may create a function object 320 to transform from device A colors to device B colors. The sequence of objects 322 for function object 320 may represent a "processing pipeline" of functions, such as functions defining operations (1) to (7) (above). The complete processing pipeline may be given as:

$$c_B = f_N(f_{N-1}(\ldots f_3(f_2(f_1(c_A)))\ldots));$$

where $C_A$ is the input color, $C_B$ is the output color, and $f_1 \ldots f_N$ are the functions of the processing pipeline. A typical processing pipeline may include a number of functions, such as 5-30.

The functions in the pipeline may be presented and computed hierarchically. For example, the overall pipeline might be defined by these two functions: $f_1()$ converts device A colors an intermediate form (called the Profile Connection Space or PCS); and $f_2()$ converts PCS colors to device B colors. The functions $f_1()$ and $f_2()$, in turn, may be composed (in hierarchical fashion) of other functions. The "leaf" functions in the hierarchy may be basic mathematical operators, such as (1) to (7).

The functions in the pipeline may be constrained to follow certain rules that may enable them to be composed together. For example, the rules may indicate that each must have one input (a vector) and produce one output (a vector), and the number of elements in the output of one function must match the required number of elements in the input of the next function in the pipeline.

As described previously, with function object 320, the processing pipeline (sequence of objects 322) may be automatically generated by function object creation component 310. Additionally, the processing pipeline, instead of being represented in a form that is opaque (e.g., to a user), can be described and modified based on the descriptive text 330 for the processing pipeline.

CONCLUSION

A self-describing function object was described above. The self-describing function object may be dynamically created based on a set of user provided parameters.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 7, the order of the acts may be modified in other implementations. Further, non-dependent acts may be performed in parallel.

Also, the term "user" has been used herein. The term "user" is intended to be broadly interpreted to include, for example, a computing device or a user of a computing device.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the articles "a" and "an" are intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a device, a request to create a function object based on one or more parameters;
    determining, by the device and based on the one or more parameters, a plurality of ordered and hierarchical operations that correspond to the function object;
    determining, by the device and based on the one or more parameters, descriptions corresponding to what is performed by at least one of the plurality of ordered and hierarchical operations;
    receiving, by the device, a request to describe the function object; and
    outputting, by the device and based on the request, documentation of the plurality of ordered and hierarchical operations included in the function object,
    the documentation including the descriptions arranged based on an identified order of the plurality of ordered and hierarchical operations.

2. The method of claim 1, where the descriptions in the documentation are visually formatted to correspond to a hierarchy of the plurality of ordered and hierarchical operations.

3. The method of claim 1, further comprising:
    associating labels with respective ones of the plurality of ordered and hierarchical operations in the documentation;
    receiving another request, from a user, to substitute a second operation for an operation corresponding to a label of the labels; and
    modifying the plurality of ordered and hierarchical operations that correspond to the function object based on the other request.

4. The method of claim 1, where the function object is generated in an interactive user session in a technical computing environment.

5. The method of claim 1, where the documentation includes hyper-text markup language (HTML) formatted documentation.

6. The method of claim 1, where the function object relates to color computation.

7. The method of claim 6, where the one or more parameters include an International Color Consortium (ICC) profile file or a reference to an ICC file.

8. The method of claim 1, where the function object, when invoked, sequentially executes each operation of the plurality of ordered and hierarchical operations based on a depth-first traversal of the plurality of ordered and hierarchical operations.

9. A non-transitory computer-readable medium storing instructions, the instructions comprising:
one or more instructions that, when executed by at least one processor, cause the at least one processor to:
receive a request to create a function object based on one or more parameters;
determine, based on the one or more parameters, a plurality of ordered and hierarchical operations that correspond to the function object;
determine, based on the one or more parameters, descriptions corresponding to what is performed by at least one of the plurality of ordered and hierarchical operations;
receive a request to describe the function object; and
output, based on the request, documentation of the plurality of ordered and hierarchical operations included in the function object,
the documentation including the descriptions arranged based on a determined order of the plurality of ordered and hierarchical operations.

10. The non-transitory computer-readable medium of claim 9, where the descriptions in the documentation are visually formatted to correspond to a hierarchy of the plurality of ordered and hierarchical operations.

11. The non-transitory computer-readable medium of claim 9, where the instructions further comprise:
one or more instructions that, when executed by the at least one processor, cause the at least one processor to:
associate labels with respective ones of the plurality of ordered and hierarchical operations in the documentation;
receive another request, from a user, to substitute a second operation for an operation corresponding to a label of the labels; and
modify the plurality of ordered and hierarchical operations that correspond to the function object based on the other request.

12. The non-transitory computer-readable medium of claim 9, where the function object is generated in an interactive user session in a technical computing environment.

13. The non-transitory computer-readable medium of claim 9, where the documentation includes hyper-text markup language (HTML) formatted documentation.

14. The non-transitory computer-readable medium of claim 9, where the function object relates to color computation.

15. The non-transitory computer-readable medium of claim 14, where the one or more parameters include an International Color Consortium (ICC) profile file or a reference to an ICC file.

16. The non-transitory computer-readable medium of claim 9, where the function object, when invoked, sequentially executes each operation of the plurality of ordered and hierarchical operations according to the determined order.

17. A device comprising:
one or more processors; and
a memory including instructions for execution by the one or more processors, the instructions causing the one or more processors to:
dynamically create, based on one or more input parameters, a function object that includes a plurality of ordered and hierarchical operations;
output, based on a request to describe the function object, documentation of the plurality of ordered and hierarchical operations included in the function object,
the documentation including textual descriptions corresponding to what is performed by at least one of the plurality of ordered and hierarchical operations,
the textual descriptions being arranged in the documentation based on an order of the plurality of ordered and hierarchical operations in the function object, and
the documentation being dynamically generated for the function object; and
sequentially execute, based on the request to invoke the function object, the plurality of ordered and hierarchical operations corresponding to the function object.

18. The device of claim 17, where the textual descriptions in the documentation are visually formatted to correspond to a hierarchy of the plurality of ordered and hierarchical operations.

19. The device of claim 17, where the instructions additionally cause the one or more processors to:
associate labels with respective ones of the plurality of ordered and hierarchical operations in the documentation;
receive another request, from a user, to substitute a second operation for an operation corresponding to a label of the labels; and
modify the plurality of ordered and hierarchical operations that correspond to the function object based on the other request.

20. The device of claim 17, where the function object is generated in an interactive user session in a technical computing environment.

21. The device of claim 17, where the documentation includes hyper-text markup language (HTML) formatted documentation.

22. The device of claim 17, where the function object relates to color computation.

23. The device of claim 17, where the one or more input parameters include an International Color Consortium (ICC) profile file or a reference to an ICC file.

* * * * *